(12) United States Patent
Miyauchi et al.

(10) Patent No.: US 8,047,511 B2
(45) Date of Patent: Nov. 1, 2011

(54) HUMIDITY CONTROL DEVICE

(75) Inventors: Hikoo Miyauchi, Tokyo (JP); Yoshihiro Mikami, Tokyo (JP)

(73) Assignee: Dyna-Air Co., Ltd., Tokyo (JP)

( * ) Notice: Subject to any disclaimer, the term of this patent is extended or adjusted under 35 U.S.C. 154(b) by 0 days.

(21) Appl. No.: 12/992,986

(22) PCT Filed: May 15, 2009

(86) PCT No.: PCT/JP2009/002150
§ 371 (c)(1),
(2), (4) Date: Jan. 20, 2011

(87) PCT Pub. No.: WO2009/144880
PCT Pub. Date: Dec. 3, 2009

(65) Prior Publication Data
US 2011/0101549 A1    May 5, 2011

(30) Foreign Application Priority Data

May 27, 2008   (JP) ................................. 2008-138083

(51) Int. Cl.
*B01F 3/04*    (2006.01)
(52) U.S. Cl. ........................ 261/151; 261/153; 261/36.1
(58) Field of Classification Search .................. 261/146, 261/150, 151, 153, 157, 29, 36.1, 95, 101, 261/115, DIG. 15
See application file for complete search history.

(56) References Cited

U.S. PATENT DOCUMENTS

| 5,471,852 | A  | * | 12/1995 | Meckler ........................... 62/271 |
| 6,018,954 | A  |   | 2/2000  | Assaf |
| 6,546,746 | B2 | * | 4/2003  | Forkosh et al. ................. 62/271 |
| 6,887,303 | B2 |   | 5/2005  | Hesse et al. |
| 6,976,365 | B2 | * | 12/2005 | Forkosh et al. .................... 62/94 |
| 2004/0112077 | A1 |   | 6/2004 | Forkosh et al. |
| 2011/0101117 | A1 | * | 5/2011 | Miyauchi et al. ........... 236/44 A |

FOREIGN PATENT DOCUMENTS

| JP | 5-220320 A | 8/1993 |
| JP | 11-37514 A | 2/1999 |
| JP | 11-504105 A | 4/1999 |
| JP | 2000-230730 A | 8/2000 |
| JP | 2004-523718 A | 8/2004 |
| JP | 2005-214595 A | 8/2005 |
| WO | 2006030901 A1 | 3/2006 |

OTHER PUBLICATIONS

International Search Report for Appl. No. PCT/JP2009/002150 dated Jul. 7, 2009.

* cited by examiner

*Primary Examiner* — Charles Bushey
(74) *Attorney, Agent, or Firm* — Pearne & Gordon LLP

(57) ABSTRACT

A humidity control device is for controlling the humidity of air in a target space, and the humidity control device comprises: a processor for controlling the humidity of air in the target space by passing air through a hygroscopic liquid L; a regenerator for regenerating the hygroscopic liquid L used for the process by the processor; a hygroscopic-liquid pipe path (50), provided so as to pass through a ventilation opening (70) intended for ventilating the target space, for transferring the hygroscopic liquid L from the processor to the regenerator; and a discharged-air-utilizing regeneration unit (60) for regenerating the hygroscopic liquid L by passing air to be discharged from the target space through the ventilation opening (70) through the hygroscopic liquid L flowing through the hygroscopic-liquid pipe path (50) toward the regenerator. A humidity control device whose energy utilization efficiency is improved is thus provided.

5 Claims, 5 Drawing Sheets

HUMIDITY CONTROL DEVICE

RELATED APPLICATIONS

This application is a national stage entry of PCT/JP2009/002150, filed May 15, 2009 under 35 U.S.C. 371, which claims the benefit of Japanese Patent Application No. 2008-138083 filed on May 27, 2008 in Japan, the contents of which are incorporated herein by reference.

TECHNICAL FIELD

The present invention relates to a humidity control device that uses a hygroscopic liquid to control the humidity.

BACKGROUND ART

Humidity control devices have been conventionally known that use a hygroscopic liquid such as lithium chloride (LiCl) to control the humidity, as described in Japanese Patent Laid-Open Application No. Hei 11-37514, Japanese Patent Laid-Open Application No. 2005-214595, and the like. A humidity control device using a hygroscopic liquid has: a processor for performing a process of taking in air from a target space, dehumidifying or humidifying the taken-in air, and returning the air to the target space; and a regenerator for regenerating the hygroscopic liquid used by the processor.

A hygroscopic liquid of a high solution concentration absorbs moisture as the temperature decreases, and a hygroscopic liquid of a low solution concentration releases moisture as the temperature increases. Taking advantage of this nature, a humidity control device controls the humidity and regenerates a hygroscopic liquid by controlling the temperature of the hygroscopic liquid to be supplied to the processor and regenerator. Here regenerating a hygroscopic liquid means to restore the concentration of the hygroscopic liquid changed due to humidity control to the same condition as before the humidity control. For example, when dehumidification is performed, moisture in air is absorbed by a hygroscopic liquid by cooling the hygroscopic liquid of a high solution concentration and passing air through the cooled hygroscopic liquid. This process reduces the solution concentration of the hygroscopic liquid. Sufficient dehumidification cannot be performed with the hygroscopic liquid of a low solution concentration, and thus the hygroscopic liquid is restored to the hygroscopic liquid of a high solution concentration by desorbing moisture from the hygroscopic liquid. On the other hand, when humidification is performed, the solution concentration of the hygroscopic liquid increases, and thus the hygroscopic liquid is restored to the hygroscopic liquid of a low solution concentration by making the hygroscopic liquid absorb moisture.

SUMMARY OF THE INVENTION

Problems to be Solved by the Invention

As mentioned above, a humidity control device using a hygroscopic liquid would regenerate the hygroscopic liquid by means of a regenerator. A regenerator uses a heat source in order to control the temperature of the hygroscopic liquid and regenerate the hygroscopic liquid. For example, when moisture is to be desorbed from the hygroscopic liquid that has absorbed moisture due to a dehumidification process, the hygroscopic liquid is heated to facilitate the desorption of moisture.

Energy is thus used also in a regenerator, and the energy utilization efficiency of a humidity control device also depends on the amount of energy required for a process in a regenerator. Here energy utilization efficiency is the ratio of the amount of air that has been dehumidified or humidified to the sum of energy used in the whole humidity control device.

A purpose of the invention is to provide a humidity control device that reduces the amount of energy required for a process in a regenerator.

Means for Solving the Problems

A humidity control device of the invention is for controlling the humidity of air in a target space, and the humidity control device comprises: a processor for controlling the humidity of air in the target space by passing air through a hygroscopic liquid; a regenerator for regenerating the hygroscopic liquid used for the process by the processor; a hygroscopic-liquid pipe path, provided so as to pass through a ventilation opening intended for ventilating the target space, for transferring the hygroscopic liquid from the processor to the regenerator; and a discharged-air-utilizing regeneration unit for regenerating the hygroscopic liquid by passing air to be discharged from the target space through the ventilation opening through the hygroscopic liquid flowing through the hygroscopic-liquid pipe path toward the regenerator.

This configuration allows the hygroscopic liquid to be regenerated by utilizing air to be discharged from a target space. That is, when a target space is to be humidified, the hygroscopic liquid flowing toward the regenerator is concentrated (does not contain much moisture) and air to be ventilated from the target space is moist, so that moisture in the air can be taken in to regenerate the hygroscopic liquid. When a target space is to be dehumidified, on the other hand, the hygroscopic liquid can be regenerated by making moisture in the hygroscopic liquid escape into dry air to be discharged from the target space. Performing a regeneration process using air discharged from a target space in this way can reduce the amount of energy required for the regeneration process in the regenerator and can increase energy utilization efficiency.

In the humidity control device of the invention, the discharged-air-utilizing regeneration unit may comprise: a hygroscopic-liquid supply unit, connected to the hygroscopic-liquid pipe path extending from the processor side, for running the hygroscopic liquid from the hygroscopic-liquid pipe path to the ventilation opening; and a liquid tank for containing the hygroscopic liquid run from the hygroscopic-liquid pipe path, the liquid tank being connected with the hygroscopic-liquid pipe path extending to the regenerator side.

Air to be discharged through the ventilation opening can be made to pass through the hygroscopic liquid by running the hygroscopic liquid from the hygroscopic-liquid supply unit and exposing it to air in the ventilation opening as described above.

In the humidity control device of the invention, the discharged-air-utilizing regeneration unit may have a filler placed between the hygroscopic-liquid supply unit and the liquid tank.

This can reduce the probability of the hygroscopic liquid splashing out of the liquid tank, and can also extend time for the hygroscopic liquid to reach the liquid tank to increase its contact time with air, improving the efficiency of the regeneration process.

The humidity control device of the invention may use as the filler a filler comprising a heat transfer material.

This configuration allows for heat exchange between the hygroscopic liquid and air and can facilitate the regeneration of the hygroscopic liquid. For example, when a dehumidification operation is performed, the hygroscopic liquid is cooled and is reduced in temperature. The heat exchange between the hygroscopic liquid and outside air performed by the filler comprising a heat transfer material increases the temperature of the hygroscopic liquid, and therefore facilitates the desorption of moisture contained in the hygroscopic liquid. When a humidification operation is performed, on the other hand, the hygroscopic liquid is heated and is increased in temperature. The heat exchange between the hygroscopic liquid and outside air performed by the filler comprising a heat transfer material reduces the temperature of the hygroscopic liquid, and therefore facilitates the absorption of moisture by the hygroscopic liquid. If the climate is hot and humid in summer and is cold and dry in winter, outside air is often at a high temperature when a dehumidification operation is performed and is often at a low temperature when a humidification operation is performed, and therefore the temperature difference between the hygroscopic liquid and outside air is large, so that a high-efficiency heat exchange can be performed.

In the humidity control device of the invention, the discharged-air-utilizing regeneration unit may have a pipe for sucking up part of the hygroscopic liquid present in the liquid tank and supplying the hygroscopic liquid to the hygroscopic-liquid supply unit.

This configuration allows part of the hygroscopic liquid in the liquid tank to circulate in the discharged-air-utilizing regeneration unit, and can thereby increase the ratio of the hygroscopic liquid that can be regenerated by air to be discharged from the ventilation opening.

There are other aspects of the invention as described below. This disclosure of the invention therefore intends to provide part of the aspects of the invention and does not intend to limit the scope of the invention described and claimed herein.

MODE OF EMBODYING THE INVENTION

A humidity control device of an embodiment of the invention will be described below with reference to the drawings. The embodiments described below are only examples of the invention, and the invention can be varied in various aspects. Therefore, the specific configurations and functions disclosed below do not limit the claims.

Figure 1:
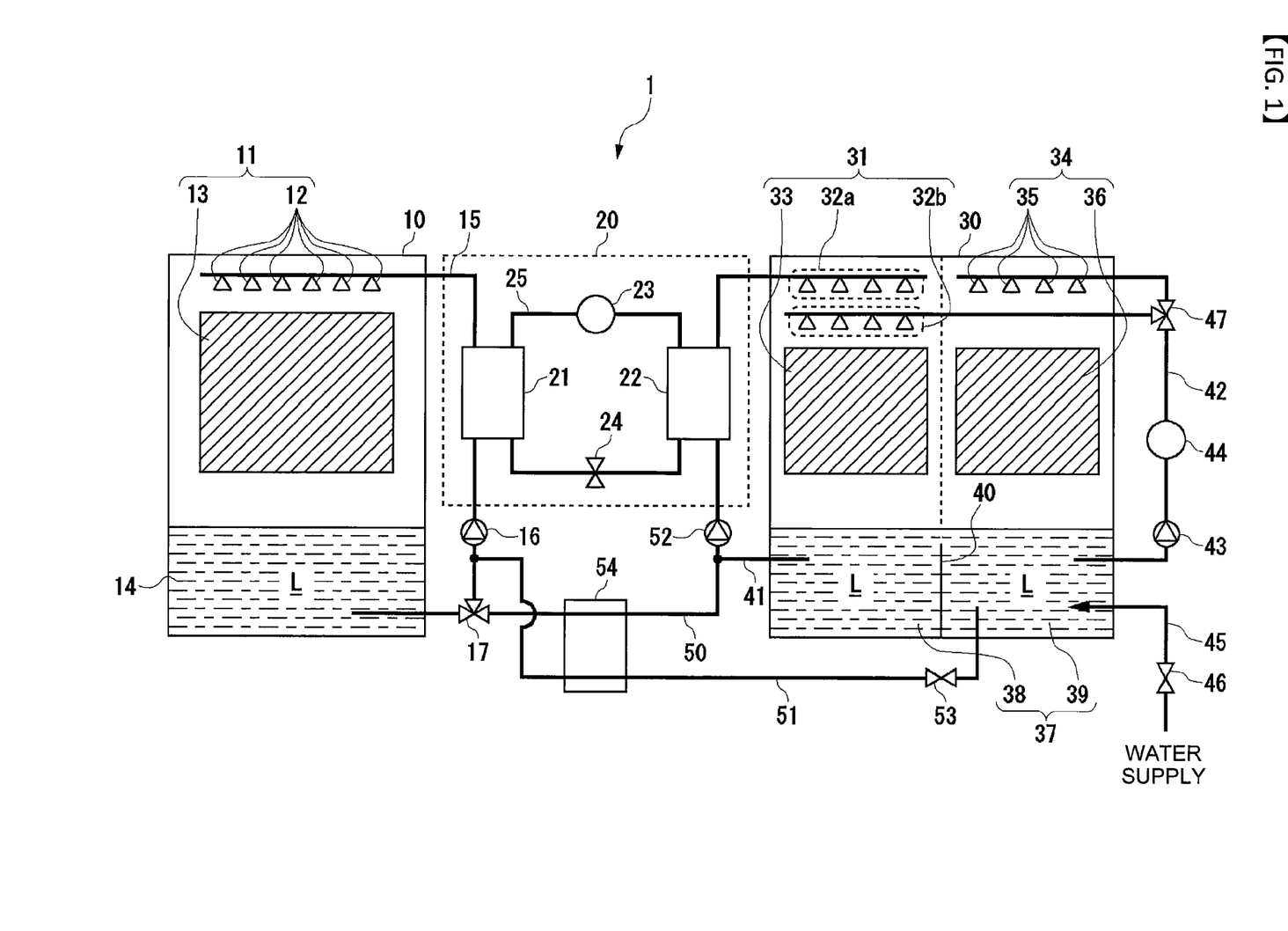
FIG. 1 shows a configuration of a humidity control device of an embodiment.

FIG. 1 shows a configuration of a humidity control device 1 of an embodiment. First, a basic configuration of the humidity control device 1 will be described with reference to FIG. 1.

The humidity control device 1 has: a processor 10 for controlling humidity by taking in air from a target space (the inside of a room) or the outside of a room and passing the taken-in air through a hygroscopic liquid L; a heat pump 20 for controlling the temperature of the hygroscopic liquid L in order for the processor 10 to perform the humidity control process; and a regenerator 30 for regenerating the hygroscopic liquid L used for the humidity control process in the processor 10. Lithium chloride (LiCl) is used as the hygroscopic liquid L in the embodiment. Not only lithium chloride, but also a solution of a deliquescent salt such as a saline solution, a highly hygroscopic polyol such as glycerol, ethylene glycol, and propylene glycol, or other inexpensive hygroscopic liquid may be used as the hygroscopic liquid.

The processor 10 is indoor equipment for controlling the humidity of air in a room, and the regenerator 30 is outdoor equipment for regenerating the hygroscopic liquid L by giving and receiving moisture to and from outside air. While FIG. 1 shows an example where one regenerator 30 is connected to one processor 10, the device may be configured so that one regenerator 30 is connected to a plurality of processors 10. For example, in a case where the humidity control device 1 is installed in an apartment house, a big supermarket, or the like, the device can be configured so that the processor 10 is installed in each room or on each floor and one regenerator 30 connected to the processors 10 is installed on the outside.

The processor 10 and the regenerator 30 are connected to each other by a first hygroscopic-liquid pipe path 50 and a second hygroscopic-liquid pipe path 51. The first hygroscopic-liquid pipe path 50 is a pipe path for transferring the hygroscopic liquid L from the processor 10 to the regenerator 30, and the second hygroscopic-liquid pipe path 51 is a pipe path for transferring the hygroscopic liquid L from the regenerator 30 to the processor 10. The hygroscopic liquid L is circulated between the processor 10 and the regenerator 30 through the first hygroscopic-liquid pipe path 50 and second hygroscopic-liquid pipe path 51, and this allows the hygroscopic liquid L used by the processor 10 to be regenerated by the regenerator 30 and be returned to the processor 10.

In the embodiment, the first hygroscopic-liquid pipe path 50 is provided so as to pass through a ventilation opening 70 intended for ventilating a target space, and has a discharged-air-utilizing regeneration unit 60 for regenerating the hygroscopic liquid by using air to be discharged from the target space through the ventilation opening 70. This will be described later.

The processor 10 has an air processing unit 11 for performing a humidity control process by passing air through the hygroscopic liquid L, and a liquid tank 14 for containing the hygroscopic liquid L. The air processing unit 11 comprises a plurality of nozzles 12 for spraying the hygroscopic liquid L downward, and a filler 13 provided between the nozzles 12 and the liquid tank 14. The filler 13 is provided for the purpose of increasing contact area between the hygroscopic liquid L and air, and also of preventing the hygroscopic liquid L from splashing. A hydrophilic filtering medium, or a heat transfer fin made of copper, aluminum, or stainless steel may be used as the filler. While an example in which the hygroscopic liquid L is sprayed by means of the nozzles 12 is described in the embodiment, a configuration in which the hygroscopic liquid L is dropped on the filler 13 may be adopted.

The processor 10 has a pipe 15 for supplying the hygroscopic liquid L present in the liquid tank 14 to the plurality of nozzles 12. A pump 16 is attached to the pipe 15, and the pump 16 sucks up the hygroscopic liquid L present in the liquid tank 14. The pipe 15 is also provided with a first heat exchanger 21 of the heat pump 20, and the first heat exchanger 21 heats or cools the hygroscopic liquid L. Whether the hygroscopic liquid L is heated or cooled depends on whether the processor 10 performs humidification or dehumidification. That is, when the processor 10 performs humidification, the hygroscopic liquid L is heated in order to make moisture contained in the hygroscopic liquid L be desorbed and taken in by air. On the other hand, when the processor 10 performs dehumidification, the hygroscopic liquid L is cooled in order to facilitate the absorption of moisture in air into the hygroscopic liquid L.

The first hygroscopic-liquid pipe path 50 for transferring the hygroscopic liquid L present in the liquid tank 14 to the regenerator 30 is connected via a three-way valve 17 to the pipe 15 for sucking up the hygroscopic liquid L from the liquid tank 14. The three-way valve 17 controls the amount of the hygroscopic liquid L to be transferred to the air processing unit 11 of the processor 10 and the amount of the hygroscopic liquid L to be transferred through the first hygroscopic-liquid pipe path 50 to the regenerator 30. In the embodiment, the three-way valve 17 controls so that (the amount of the hygroscopic liquid L to be transferred to the air processing unit 11):(the amount of the hygroscopic liquid L to be transferred to the regenerator 30) will be a ratio between 8:2 and 9:1.

A second heat exchanger 22 of the heat pump 20 is provided in the first hygroscopic-liquid pipe path 50, and cools or heats the hygroscopic liquid L to be supplied to the regenerator 30. Here a configuration of the heat pump 20 will be described. The heat pump 20 comprises the first heat exchanger 21, the second heat exchanger 22, a compressor 23, an expansion valve 24, and a refrigerant pipe 25 for connecting them to one another. The heat pump 20 can make the first heat exchanger 21 function as an evaporator or as a condenser by reversing the flow of the refrigerant. The second heat exchanger 22 performs an inverse process of the first heat exchanger 21.

The regenerator 30 will next be described. The regenerator 30 has a first regeneration processing unit 31 and second regeneration processing unit 34 for performing a regeneration process on the hygroscopic liquid L by passing air therethrough, and a liquid tank 37 for containing the hygroscopic liquid L. The first regeneration processing unit 31 comprises pluralities of nozzles 32a and 32b for spraying the hygroscopic liquid L downward, and a filler 33 provided below the nozzles 32a and 32b. Similarly, the second regeneration processing unit 34 comprises a plurality of nozzles 35 for spraying the hygroscopic liquid L downward, and a filler 36 provided below the nozzles 35. While an example in which the hygroscopic liquid L is sprayed by means of the nozzles 32a and 32b is described in the embodiment, a configuration in which the hygroscopic liquid L is dropped on the filler 33 may be adopted.

The liquid tank 37 of the regenerator 30 is partitioned by a partition 40 which is lower than the liquid surface of the hygroscopic liquid L, so that a first tank 38 and a second tank 39 are formed. The height of the partition 40 can be designed as appropriate, and in the embodiment is 80% of the height of the liquid surface. The second tank 39 is connected with the second hygroscopic-liquid pipe path 51, and the hygroscopic liquid L regenerated by the regenerator 30 is returned from the second tank 39 to the processor 10.

The first regeneration processing unit 31 performs a regeneration process on the hygroscopic liquid L by spraying downward from the nozzles 32a the hygroscopic liquid L supplied from the first hygroscopic-liquid pipe path 50. The hygroscopic liquid L regeneration-processed by the first regeneration processing unit 31 enters the first tank 38. The first tank 38 is connected via a pipe 41 to the first hygroscopic-liquid pipe path 50. Part of the hygroscopic liquid L in the first tank 38 is supplied through the pipe 41 to the first hygroscopic-liquid pipe path 50, and is supplied through the second heat exchanger 22 to the first regeneration processing unit 31 again. With such circulation of the hygroscopic liquid L present in the first tank 38, the first regeneration processing unit 31 repeatedly performs the regeneration process on the hygroscopic liquid L.

Since the partition 40 between the first tank 38 and the second tank 39 is lower than the liquid surface, the hygroscopic liquid L in the first tank 38 flows into the second tank 39 as the hygroscopic liquid L supplied from the processor 10 enters the first tank 38.

The regenerator 30 has a pipe 42 for supplying the hygroscopic liquid L present in the second tank 39 to the nozzles 32b or nozzles 35. The regenerator 30 can control a supply destination of the hygroscopic liquid L by means of a three-way valve 47 provided on the pipe 42. The three-way valve 47 may be switched so that the hygroscopic liquid L may be supplied to either one of the nozzles 32b or nozzles 35, or the amounts of the hygroscopic liquid L to be supplied from the three-way valve 47 to the nozzles 32b and nozzles 35 may be made to differ. In the embodiment, the three-way valve 47 supplies the hygroscopic liquid L to the nozzles 35 during dehumidification operation, and supplies the hygroscopic liquid L to the nozzles 32b during humidification operation.

A pump 43 is attached to the pipe 42, and it sucks up the hygroscopic liquid L present in the second tank 39. A heat source 44 is attached to this pipe 42, and it heats the hygroscopic liquid L sucked up from the second tank 39. The second regeneration processing unit 34 performs a regeneration process on the hygroscopic liquid L sucked up from the second tank 39. The hygroscopic liquid L regeneration-processed by the second regeneration processing unit 34 enters the second tank 39 again.

The regenerator 30 has a water supply pipe 45 for supplying water to the second tank 39. The water supply pipe 45 is provided with a valve 46, which controls the water supply.

The hygroscopic liquid L in the second tank 39 returns through the second hygroscopic-liquid pipe path 51 to the processor 10. The amount of the hygroscopic liquid L to return from the regenerator 30 to the processor 10 is controlled by a valve 53. In the embodiment, the valve 53 controls the amount of the hygroscopic liquid L to be returned to the processor 10 so as to make the height of the liquid surface of the hygroscopic liquid L in the liquid tank 37 be constant.

The humidity control device 1 has a heat exchanger 54 for exchanging heat between the first hygroscopic-liquid pipe path 50 and the second hygroscopic-liquid pipe path 51. This heat exchanger 54 reduces the temperature difference between the hygroscopic liquid L flowing through the first hygroscopic-liquid pipe path 50 and the hygroscopic liquid L flowing through the second hygroscopic-liquid pipe path 51, and contributes to reducing the temperature difference between the hot and cold sides of the heat pump 20.

Figure 2:
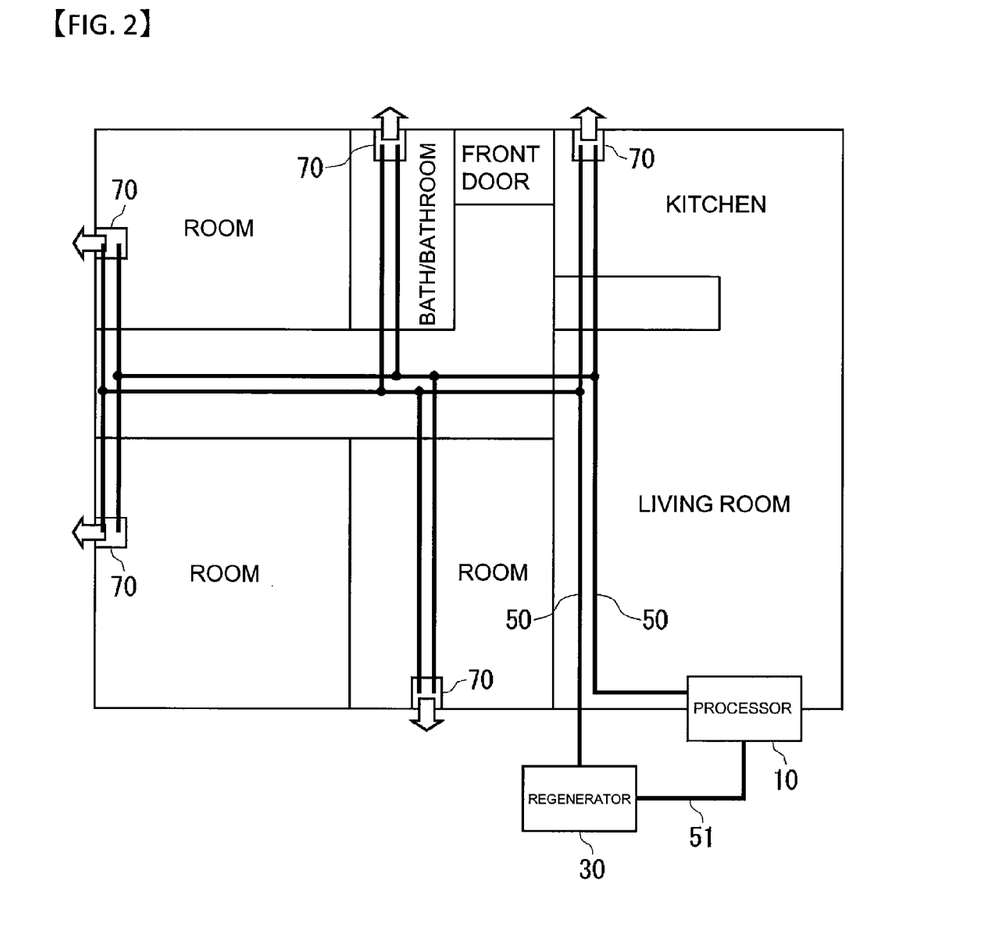
FIG. 2 shows a hygroscopic-liquid pipe path of the humidity control device of the embodiment.

FIG. 2 shows an example of how the first hygroscopic-liquid pipe path 50 is provided. In the embodiment, the first hygroscopic-liquid pipe path 50 for transferring the hygroscopic liquid L from the processor 10 to the regenerator 30 is provided so as to pass through the ventilation opening 70 that ventilates a target space. The hygroscopic-liquid pipe path 50 is relatively small in pipe diameter, and therefore can be adequately contained even in a space above the ceiling of an earthquake-resistant construction. Each ventilation opening 70 has the discharged-air-utilizing regeneration unit 60 that regenerates the hygroscopic liquid L by utilizing air to be discharged from a target space. The ventilation opening 70 may have, but need not have, a fan for forcibly discharging air from a target space.

Figure 3:
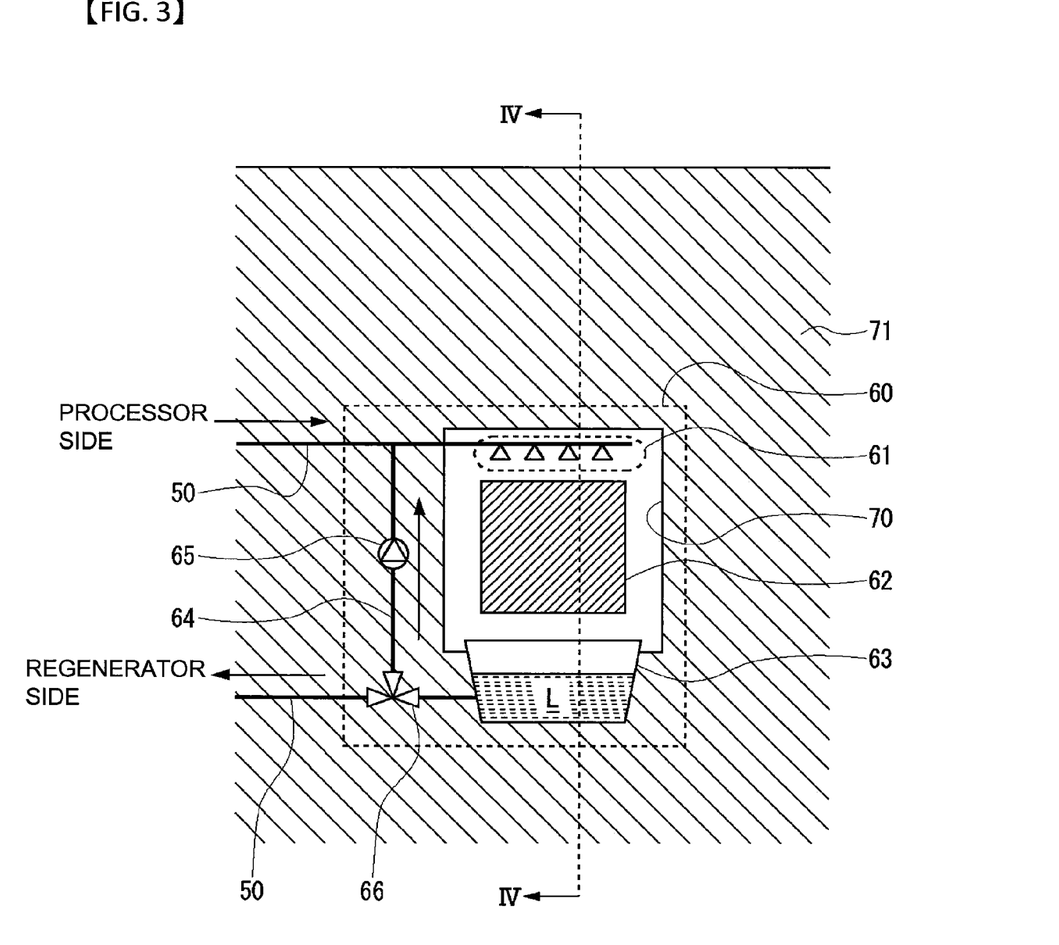
FIG. 3 shows a configuration of a discharged-air-utilizing regeneration unit.

FIG. 3 is a cross section showing a configuration of the discharged-air-utilizing regeneration unit 60. The discharged-air-utilizing regeneration unit 60 is provided in the ventilation opening 70 provided in a wall 71 that separates a target space and the outside. The discharged-air-utilizing regeneration unit 60 has a hygroscopic-liquid supply unit 61, connected to the first hygroscopic-liquid pipe path 50 extending from the side of the processor 10, for running the hygroscopic liquid L from the hygroscopic-liquid pipe path to the ventilation opening 70. In the embodiment, the hygroscopic-liquid supply unit 61 has a plurality of nozzles and sprays the hygroscopic liquid L toward a filler 62. The hygroscopic-liquid supply unit 61 need not necessarily have nozzles and, for example, may be configured in such a way that a plurality of holes for dropping the liquid are formed on the first hygroscopic-liquid pipe path 50.

The discharged-air-utilizing regeneration unit 60 has the filler 62 placed on the side to which the hygroscopic liquid L is supplied by the hygroscopic-liquid supply unit 61 (the downside, in this case), and a liquid tank 63 for containing the hygroscopic liquid L supplied from the hygroscopic-liquid supply unit 61. The filler 62 comprises, for example, a heat transfer fin made of copper, aluminum, or stainless steel. The liquid tank 63 is connected with the first hygroscopic-liquid pipe path 50 extending to the side of the regenerator 30. The hygroscopic liquid L in the liquid tank 63 is transferred through the first hygroscopic-liquid pipe path 50 to the regenerator 30.

The first hygroscopic-liquid pipe path 50 connected to the liquid tank 63 is provided with a sucking up pipe 64 for supplying part of the hygroscopic liquid L, flowing through the first hygroscopic-liquid pipe path 50, to the hygroscopic-liquid supply unit 61. A pump 65 is attached to the sucking up pipe 64, and the pump 65 sucks up the hygroscopic liquid L from the first hygroscopic-liquid pipe path 50. The sucking up pipe 64 is attached to the first hygroscopic-liquid pipe path 50 via a three-way valve 66. The three-way valve 66 is configured to be able to control the amount of the liquid flowing toward the regenerator 30 and the amount of the liquid flowing toward the hygroscopic-liquid supply unit 61. While in the embodiment the configuration in which the hygroscopic liquid L is sucked up from the first hygroscopic-liquid pipe path 50 has been described as an example, the hygroscopic liquid L may be sucked up from the liquid tank 63 and be supplied to the hygroscopic-liquid supply unit 61.

Now, an operation of the humidity control device 1 of the embodiment will be described. In the humidity control device 1 of the embodiment, the processor 10 takes in air from a target space or the outside of a room and passes the taken-in air through the hygroscopic liquid L, thereby transferring moisture between the air and the hygroscopic liquid L to control the humidity of the air. The hygroscopic liquid L used for the humidity control in the processor 10 is transferred to the regenerator 30, and is regenerated to the original solution concentration by the regenerator 30. In the embodiment, the hygroscopic liquid L is subsidiarily regenerated by the discharged-air-utilizing regeneration unit 60 provided in the first hygroscopic-liquid pipe path 50 through which the hygroscopic liquid L is transferred from the processor 10 to the regenerator 30.

Figure 4A:
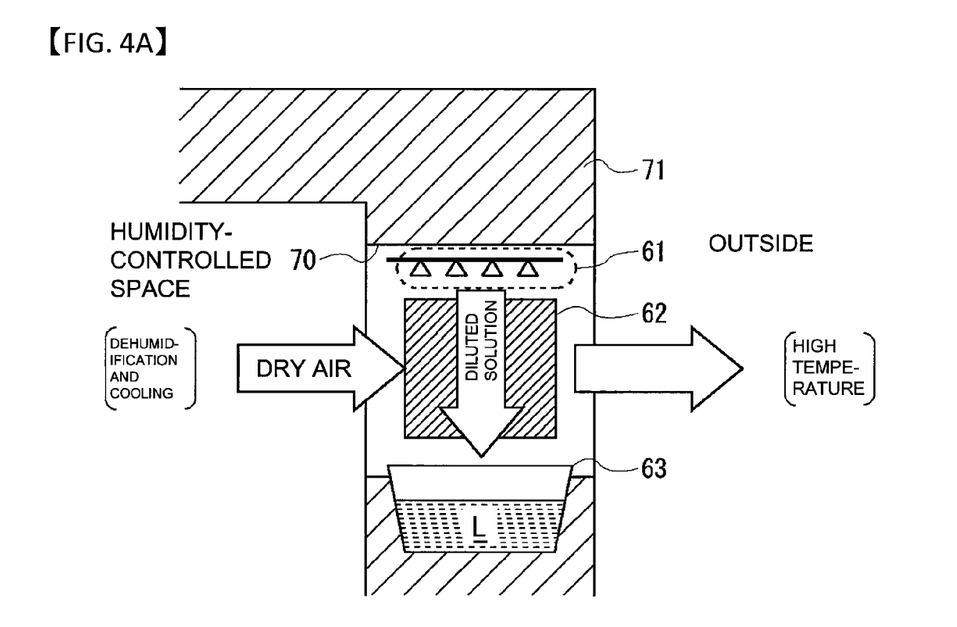
FIG. 4A shows an operation of the discharged-air-utilizing regeneration unit in dehumidification operation.

FIG. 4A illustrates a regeneration process on the hygroscopic liquid L in dehumidification operation. FIG. 4A is a cross section cut along IV-IV in FIG. 3. FIG. 4A shows air being discharged from a target space to the outside.

In dehumidification operation, as shown in FIG. 4A, the hygroscopic liquid L absorbs moisture from air, and therefore the hygroscopic liquid L used for the humidity control by the processor 10 becomes a diluted solution. This diluted solution is supplied from the hygroscopic-liquid supply unit 61 to the filler 62. The air to be discharged from the target space is dehumidification-processed dry air. Contact between the diluted solution of the hygroscopic liquid L staying on the filler 62 and the dry air therefore causes moisture contained in the hygroscopic liquid L to be desorbed and escape into the air. The discharged-air-utilizing regeneration unit 60 can thus use the discharged air to regenerate the hygroscopic liquid L.

The hygroscopic liquid L used for the dehumidification process by the processor 10 is cooled and is reduced in temperature. A heat transfer fin is used as the filler 62 in the embodiment, and therefore heat exchange is performed between the hygroscopic liquid L staying on the filler 62 and the air, increasing the temperature of the hygroscopic liquid L. Dehumidification operation is often performed in summer when it is humid, and then the temperature of the filler 62 increases under the influence of the temperature of outside air. Consequently, the heat of the outside air is conducted through the filler 62 to the hygroscopic liquid L and increases the temperature of the hygroscopic liquid L, further facilitating the desorption of moisture contained in the hygroscopic liquid L, and therefore the hygroscopic liquid L can be efficiently regenerated. The increase in the temperature of the hygroscopic liquid L caused by the discharged-air-utilizing regeneration unit 60 allows energy required for heating the hygroscopic liquid L in the regenerator 30 to be reduced.

Figure 4B:
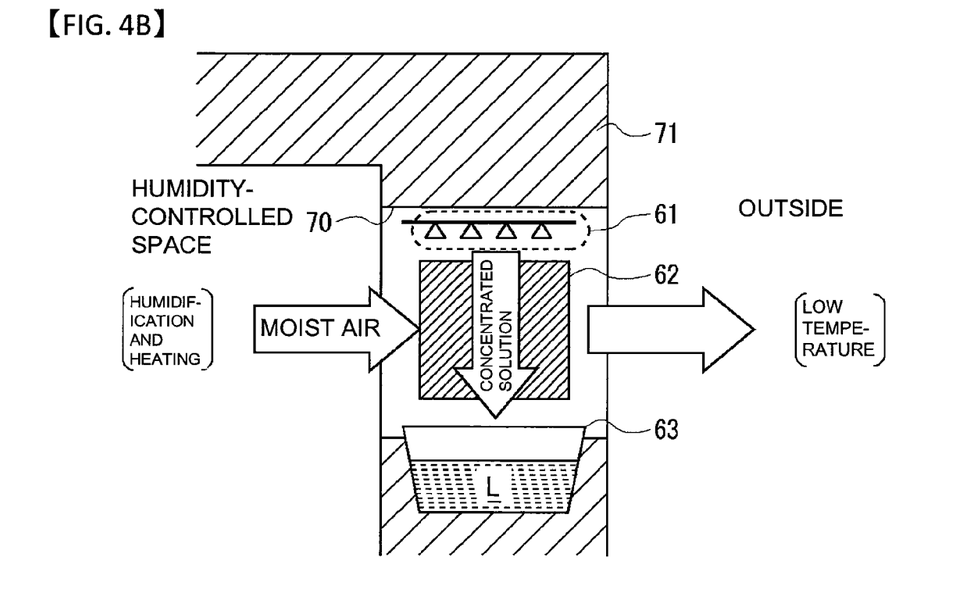
FIG. 4B shows an operation of the discharged-air-utilizing regeneration unit in humidification operation.

FIG. 4B illustrates a regeneration process on the hygroscopic liquid L in humidification operation. In humidification operation, as shown in FIG. 4B, moisture in the hygroscopic liquid L is released to air, and therefore the hygroscopic liquid L used for the humidity control by the processor 10 becomes a concentrated solution. This concentrated solution is supplied from the hygroscopic-liquid supply unit 61 to the filler 62. The air to be discharged from the target space is humidification-processed moist air. Contact between the concentrated solution of the hygroscopic liquid L staying on the filler 62 and the moist air therefore causes the hygroscopic liquid L to absorb moisture from the air. The discharged-air-utilizing regeneration unit 60 can thus use the discharged air to regenerate the hygroscopic liquid L.

The hygroscopic liquid L used for the humidification process by the processor 10 is heated and is increased in temperature. Since a heat transfer fin is used as the filler 62 in the embodiment, heat exchange is performed between the hygroscopic liquid L staying on the filler 62 and the air, reducing the temperature of the hygroscopic liquid L. Humidification operation is often performed in winter when the air is dry, and then the temperature of the filler 62 decreases under the influence of the temperature of outside air. Consequently, the heat of the outside air is conducted through the filler 62 to the hygroscopic liquid L and decreases the temperature of the hygroscopic liquid L, facilitating the absorption of moisture by the hygroscopic liquid L, and therefore the hygroscopic liquid L can be efficiently regenerated. The decrease in the temperature of the hygroscopic liquid L caused by the discharged-air-utilizing regeneration unit 60 allows energy required for cooling the hygroscopic liquid L in the regenerator 30 to be reduced. The above is a description of the configuration and operation of the humidity control device 1 of the embodiment.

In the humidity control device 1 of the embodiment, the first hygroscopic-liquid pipe path 50 for transferring the hygroscopic liquid L used for the humidity control process by the processor 10 to the regenerator 30 is provided so as to pass through the ventilation opening 70, and the discharged-air-utilizing regeneration unit 60 provided in the ventilation opening 70 uses air discharged from a target space to regenerate the hygroscopic liquid L subsidiarily. This allows the discharged-air-utilizing regeneration unit 60 to take charge of part of the regeneration process on the hygroscopic liquid L performed by the regenerator 30, and therefore reduces the processing load on the regenerator 30. Accordingly, energy required for the regeneration process by the regenerator 30 can be reduced.

The humidity control device 1 of the embodiment discharges air through the filler 62, and therefore has an advantage of being able to clean dust, a smell, or the like present in discharged air, also, by means of the hygroscopic liquid L and discharge the cleaned air. The discharged-air-utilizing regeneration unit 60 of the embodiment can therefore be applied suitably to a bathroom, a kitchen, or the like. The hygroscopic liquid L that has absorbed dust, a smell, or the like can be collectively purified by providing the regenerator 30 with a component for cleaning.

While a humidity control device of the invention has been described in detail above with an embodiment, the invention is not limited to the above-described embodiment.

In the above embodiment, the humidity control device 1 has been described with an example in which the heat pump 20 is used as the heat source 21 of the processor 10 and the heat source 22 of the regenerator 30. However, the humidity control device of the invention only requires to be a humidity control device using the hygroscopic liquid L, and need not necessarily use the heat pump 20.

Figure 5:
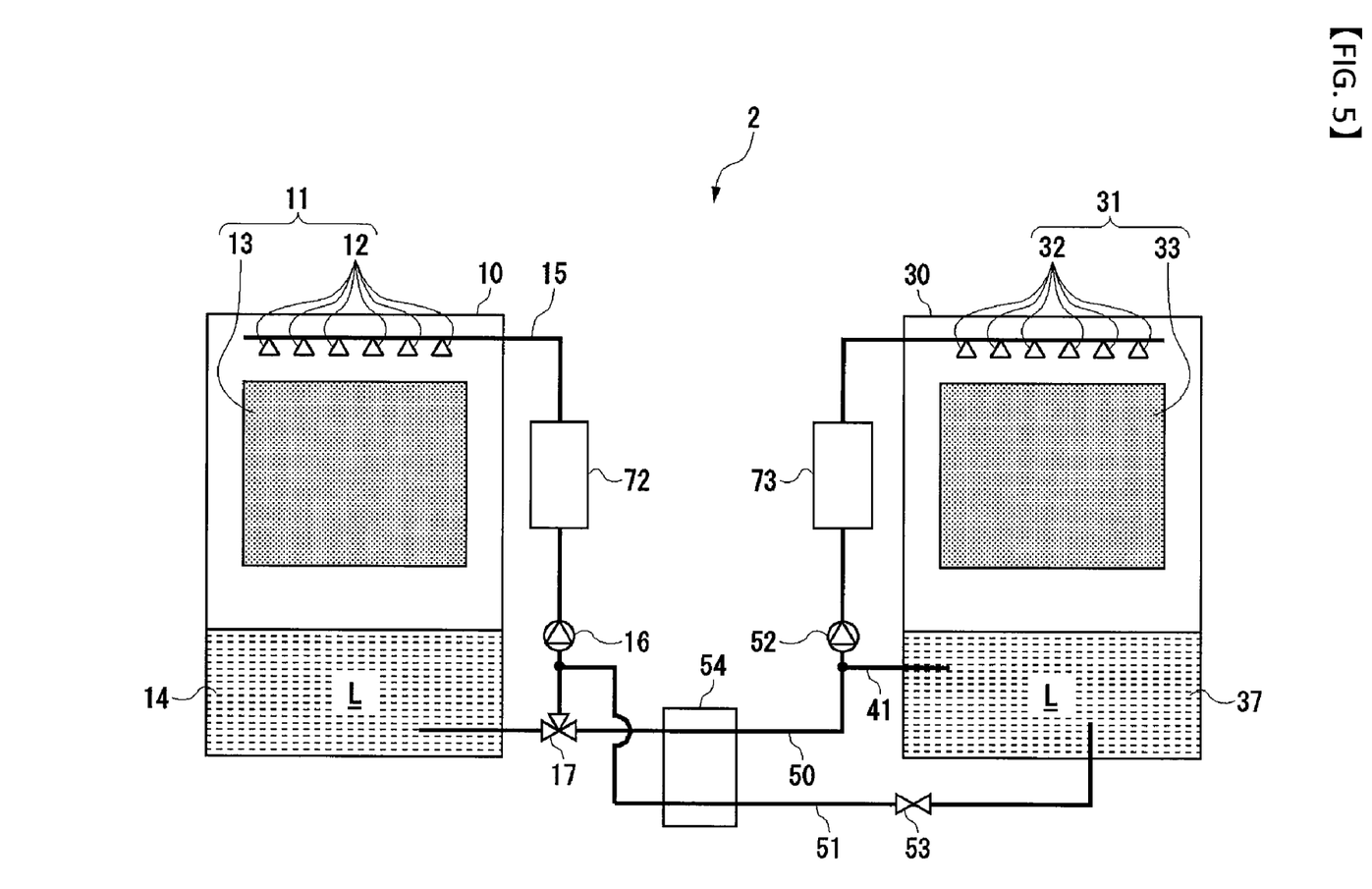
FIG. 5 shows a configuration of a humidity control device according to a variation.

FIG. 5 shows another example of a humidity control device to which the invention can be applied. The configuration of a humidity control device 2 shown in FIG. 5 is basically the same as that of the humidity control device 1 of the above-described embodiment, but is different therefrom in that the processor 10 and the regenerator 30 have separate heat sources 72 and 73. A configuration in which heat exchange is performed with the hygroscopic liquid L by supplying cold or hot water, for example, can be adopted as the heat sources 72 and 73 of the processor 10 and the regenerator 30.

In the above-described embodiment, an example has been given in which the discharged-air-utilizing regeneration unit 60 comprises the hygroscopic-liquid supply unit 61, the filler 62 comprising a heat transfer material, the liquid tank 63, and the sucking up pipe 64. However, the discharged-air-utilizing regeneration unit 60 only requires to be configured to be able to transfer moisture between the hygroscopic liquid L and discharged air, and is not necessarily limited to the above-described configuration. For example, the filler 62 need not necessarily be a heat transfer material and there need not be the sucking up pipe 64, in the above-described embodiment.

The discharged-air-utilizing regeneration unit 60 may be configured differently from the above-described discharged-air-utilizing regeneration unit 60. For example, it may be configured so that the hygroscopic liquid L in the liquid tank 63 is stirred and discharged air is blown on the liquid surface, or may be configured so that discharged air is directly supplied into the hygroscopic liquid L contained in the liquid tank 63.

While there have been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

As described above, the invention has an advantage of being able to reduce energy required for the regeneration process in the regenerator by using air discharged from a target space to regenerate a hygroscopic liquid, and is useful as a humidity control device that uses a hygroscopic liquid to control the humidity.

The invention claimed is:

1. A humidity control device for controlling the humidity of air in a target space, the humidity control device comprising:
   a processor for controlling the humidity of air in the target space by passing air through a hygroscopic liquid;
   a regenerator for regenerating the hygroscopic liquid used for the process by the processor, the regenerator is disposed outside the target space;
   a hygroscopic-liquid pipe path, provided so as to pass through a ventilation opening intended for ventilating the target space, for transferring the hygroscopic liquid from the processor to the regenerator; and
   a discharged-air-utilizing regeneration unit for regenerating the hygroscopic liquid by passing air to be discharged from the target space through the ventilation opening through the hygroscopic liquid flowing through the hygroscopic-liquid pipe path toward the regenerator.

2. The humidity control device according to claim 1, wherein the discharged-air-utilizing regeneration unit comprises:
   a hygroscopic-liquid supply unit, connected to the hygroscopic-liquid pipe path extending from the processor side, for running the hygroscopic liquid from the hygroscopic-liquid pipe path to the ventilation opening; and
   a liquid tank for containing the hygroscopic liquid run from the hygroscopic-liquid pipe path, the liquid tank being connected with the hygroscopic-liquid pipe path extending to the regenerator side.

3. The humidity control device according to claim 2, wherein the discharged-air-utilizing regeneration unit has a filler placed between the hygroscopic-liquid supply unit and the liquid tank.

4. The humidity control device according to claim 3, wherein the filler comprises a heat transfer material.

5. The humidity control device according to any one of claims 2 to 4, wherein the discharged-air-utilizing regeneration unit has a pipe for sucking up part of the hygroscopic liquid present in the liquid tank and supplying the hygroscopic liquid to the hygroscopic-liquid supply unit.

* * * * *